Figure 1:
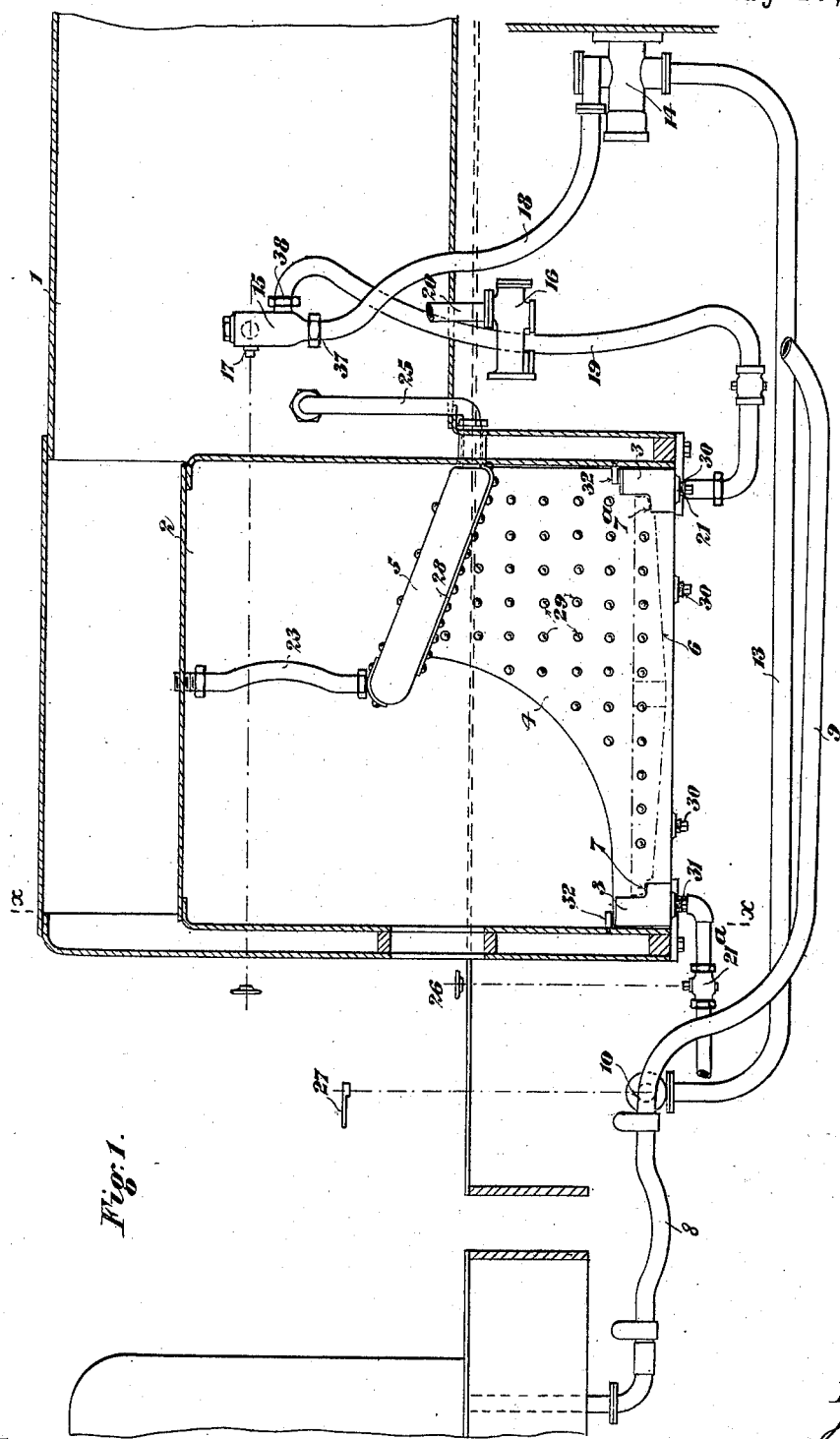

(No Model.)   4 Sheets—Sheet 1.

J. KING.
HEATING FEED WATER AND CIRCULATION.

No. 604,052.   Patented May 17, 1898.

Witnesses:
Arthur Woodman
William N. Leever

Inventor
John King
per Jno. D. O'Donnell
Attorney.

(No Model.) 4 Sheets—Sheet 3.

J. KING.
HEATING FEED WATER AND CIRCULATION.

No. 604,052. Patented May 17, 1898.

Witnesses:—
Arthur Woodman.
William H. Lewis

Inventor
John King.
per John W. O'Donnell
Attorney.

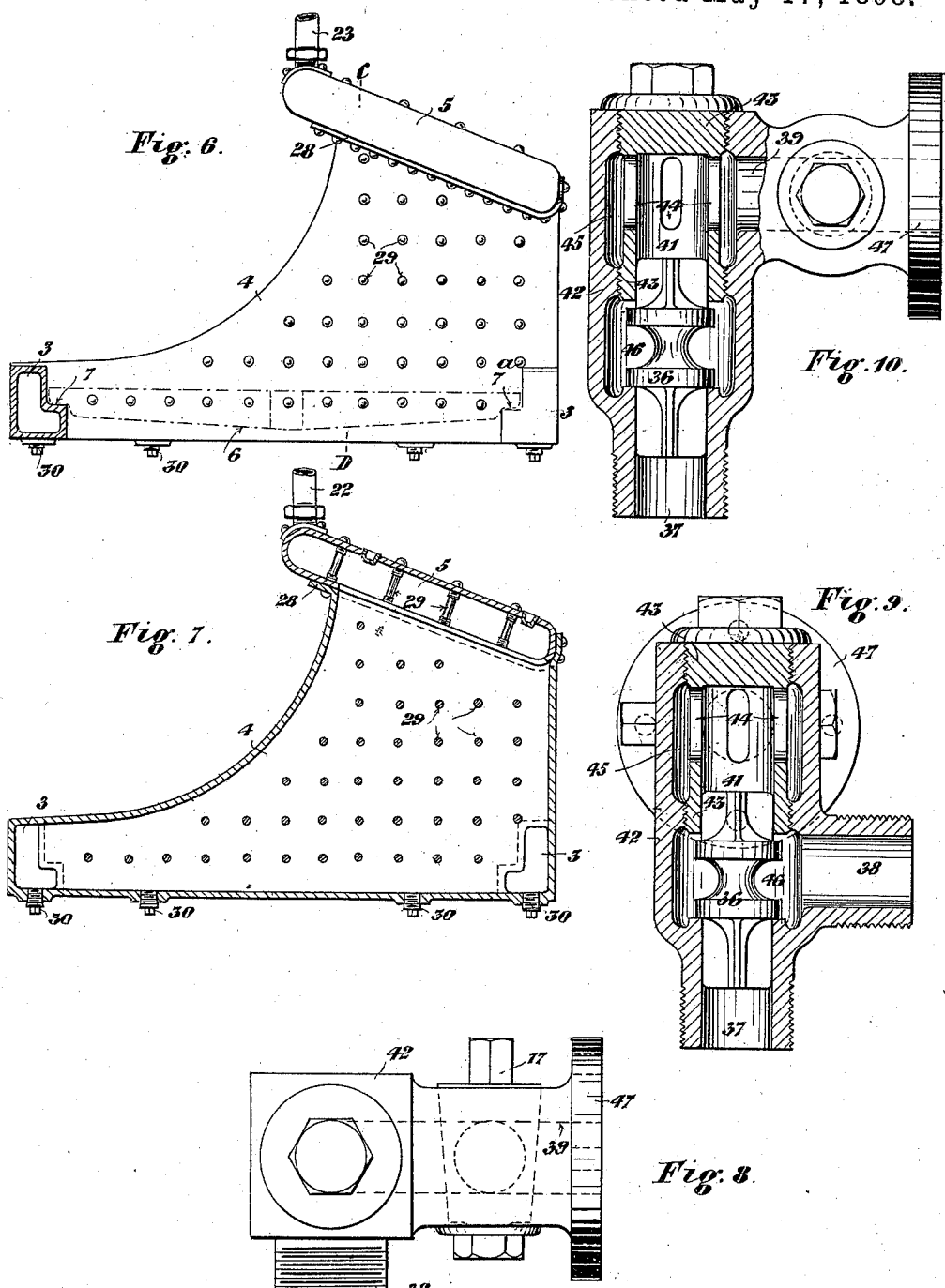

UNITED STATES PATENT OFFICE.

JOHN KING, OF LONDON, ENGLAND.

HEATING FEED-WATER AND CIRCULATION.

SPECIFICATION forming part of Letters Patent No. 604,052, dated May 17, 1898.

Application filed July 19, 1897. Serial No. 645,095. (No model.)

*To all whom it may concern:*

Be it known that I, JOHN KING, a subject of the Queen of Great Britain and Ireland, residing at 70 and 71 Palace Chambers, Westminster, London, in the county of Middlesex, England, have invented a new and useful improved means and apparatus for heating feed-water, promoting water circulation, and generating steam in locomotive and other steam boilers, of which the following is a specification.

My invention has reference to improvements on the invention set forth in the specification of United States Letters Patent No. 569,646, dated October 20, 1896, granted to myself, Charles Downes, and John Waddington.

The objects of my present invention are the same as those set forth in the above-cited specification—namely, to effect a saving of coal either when working as a superheater or as a steam-generator, a great deal of the heat which is now lost in solid combustion-plates and brick arches being utilized for heating the feed-water and producing steam. The burning of fire-bars is also prevented and to a great extent the formation of clinker. My invention also helps to filter the water, preventing a great deal of mud and foreign matter passing into the boiler, the life of the boiler being thereby prolonged, owing to a lot of the destructive chemicals in the feed-water being retained in the hollow carrier and deflector instead of passing into the boiler.

My present invention relates more particularly to constructional improvements in the combined water-space fire-bar carrier and deflector described in the above-cited specification of Letters Patent No. 569,646, of 1896, rendering it more efficient.

I will now describe my invention as applied in connection with a locomotive-boiler.

My improved combined fire-bar carrier and deflector is constructed as follows: The lower portion, forming the fire-bar carrier, is made (taking an underneath view of it from either side when in position in the fire-box) in the form of the letter H, similar to that described in the above-mentioned specification, and is hollow throughout, the center cross-bar portion being carried upward in the form of a hollow web or partition and connected to the deflector, which is situated above. The whole, if desired, may be cast in one piece, or a flange may be provided at the top of the hollow web at each side and the deflector bolted on. A suitable number of stays are provided in order to withstand steam-pressure. The entrance for the feed-water is arranged on the under side of the inner end of the carrier portion at the back of the fire-box, and the outlet-pipes for the passage of the heated feed-water to the boiler are connected to the deflector at its highest point. Screwed studs or projections are provided on the walls of the fire-box to prevent the carrier and deflector from lifting, and water-space studs are also provided to support the end of the deflector. The ends of the carrier which support the fire-bars rise from each side to the center connecting web or partition in order to allow the steam formed to escape more freely, and the hollow deflector is also made higher or deeper at each side for the same purpose. A suitable number of washout-plugs are provided in the deflector and carrier. The remaining parts working in connection with my improved combined fire-bar carrier and deflector, as above described, are similar to those set forth in the above-cited specification of Letters Patent No. 569,646, of 1896, with the exception that the feed and circulation pipe is connected at the inner end of the carrier portion, as above mentioned, thereby doing away with the four-way piece which in that specification was connected to the front end of the carrier and formed the entrance for the feed-water.

I also employ in my present invention an improved form of double-clack valve for the pump and injector.

In order that my invention may be better understood and more readily carried into effect, I will now describe it with reference to the accompanying drawings, in which—

Figure 2:
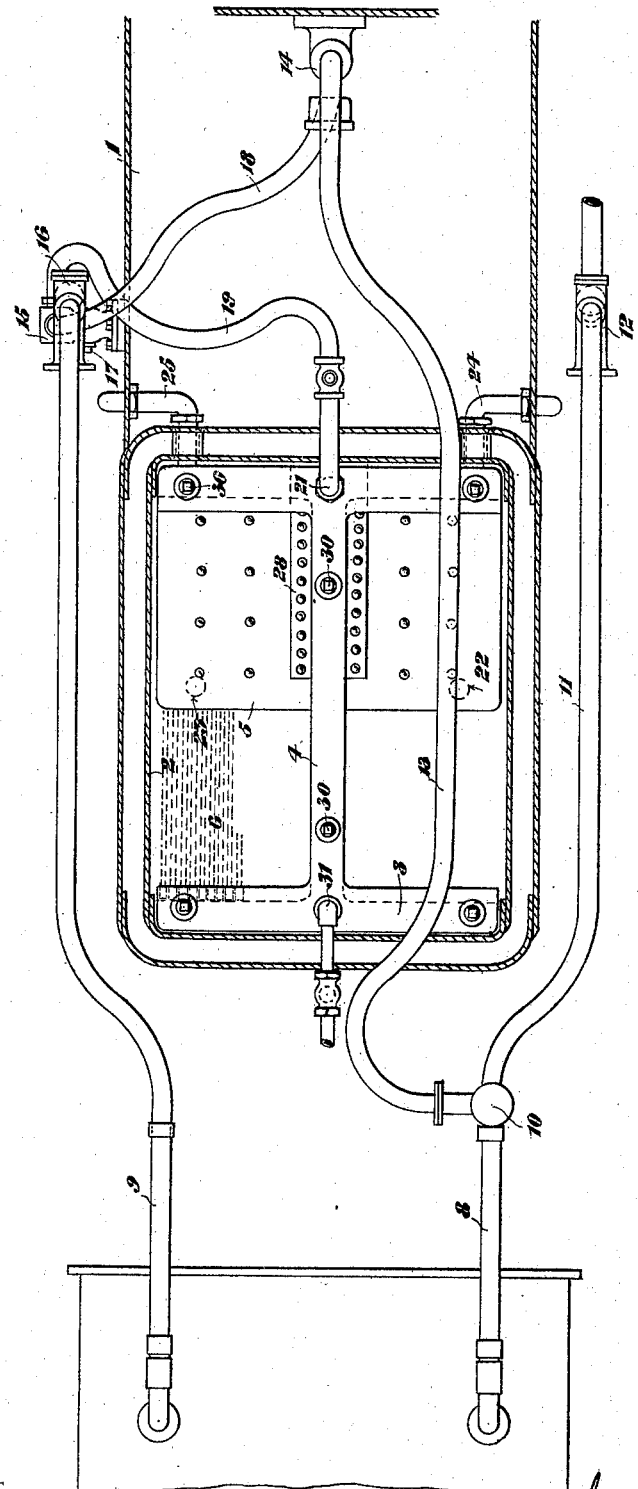
Figure 3:
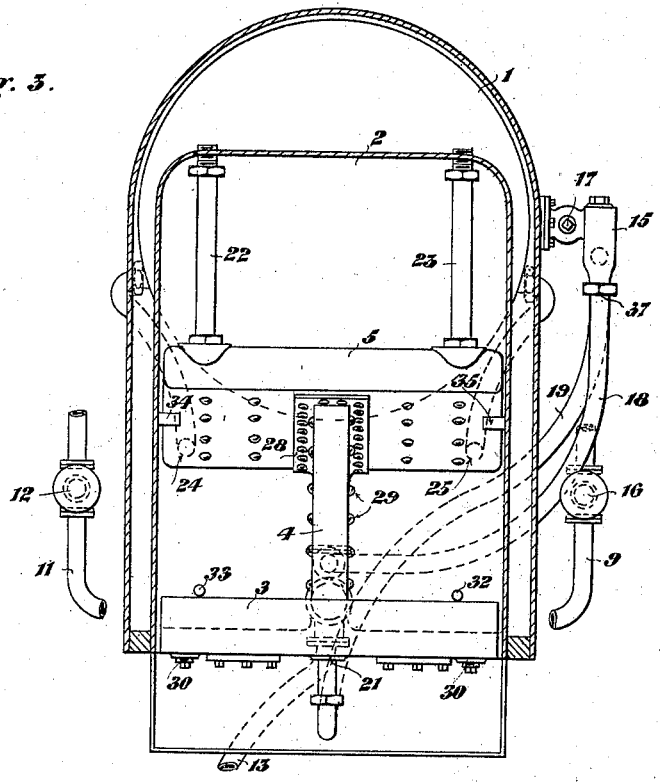
Figure 4:
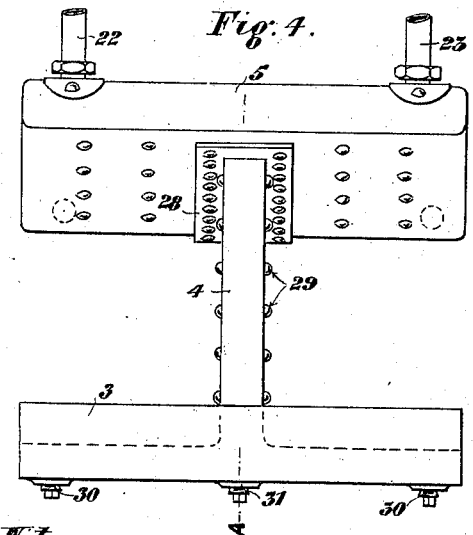
Figure 5:
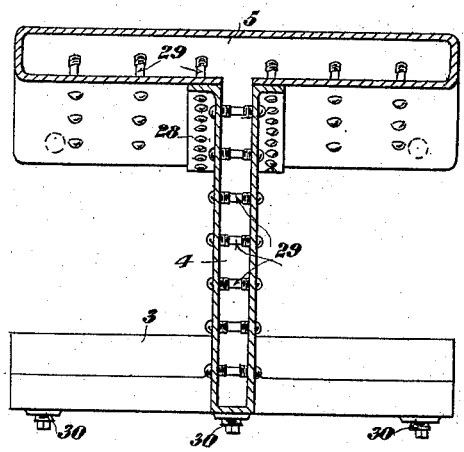

Figure 1 shows, as an example, a locomotive-boiler fitted with my improved hollow water-space fire-bar carrier and deflector. Fig. 2 is an underneath view of Fig. 1. Fig. 3 is a cross-section taken on the line $x\,x$ in Fig. 1. Figs. 4, 5, 6, and 7 show details of the hollow fire-bar carrier and deflector and the connecting web or partition, Fig. 4 being a front view; Fig. 5, a sectional front elevation on line C D, Fig. 6; Fig. 6, a side elevation showing the hollow fire-bar carrier, partly in section; and Fig. 7, a sectional side elevation on line A B, Fig. 4. Figs. 8, 9, and 10 show details of my improved clack-valve, Fig. 8 being a plan; Fig. 9, a sectional elevation looking toward the side of the boiler, as in Fig. 1; and Fig. 10, a sectional elevation looking toward the foot-plate end of the boiler, as in Fig. 2.

The same numbers refer to the same parts in the several figures of the drawings.

1, Figs. 1, 2, and 3, is the barrel of the boiler.

2 is the fire-box, in which my improved hollow fire-bar carrier and deflector is situated.

3 is the hollow fire-bar carrier or support, preferably formed of the section shown.

4 is the hollow partition or web connecting the support 3 with the hollow deflector 5.

6 are the fire-bars, (shown dotted,) resting at their ends 7 7ª on the hollow support 3.

8 and 9 are feed-water-supply pipes from the tender or water-tank to the boiler.

10 is an ordinary two-way cock, to which pipe 11 to injector 12 and pipe 13 to pump 14 are connected.

15 is my improved double clack for pump 14 and injector 16.

16 is the supplementary injector for the carrier and deflector should the locomotive not have a pump.

17 is a shut-off valve between clack 15 and the boiler.

18 is the pipe or connection from the pump 14 to clack 15, and 19 is the pipe or connection from the clack 15 to the hollow fire-bar support, as shown, the inlet being at 21.

20 is the pipe connecting injector 16 with clack 15.

21ª is the blow-down cock, connected to the forward end of the hollow fire-bar carrier.

22, 23, 24, and 25 are pipes or connections from the hollow deflector 5 to the boiler 1.

26 is a handle on the foot-plate for working the blow-down cock 21ª, and 27 is a handle on the foot-plate for working the two-way cock 10.

Referring to Figs. 4, 5, 6, and 7, which illustrate my improved fire-bar carrier and deflector, 28 is a flange at the top of the central hollow web or partition connecting the carrier 3 with deflector 5, the means of attachment being by bolts, rivets, or otherwise. 29 are stay rods or bolts (any desired number being provided) for the purpose of enabling the hollow web 4 and the deflector 5 to withstand steam-pressure. 30 are washout-plugs, and 31 is the entrance or inlet for the pipe or connection of blow-down cock 21ª, Fig. 1. 32 and 33 (see Figs. 1 and 2) are studs screwed into the fire-box to keep the carrier and deflector from lifting. 34 and 35, Fig. 3, are water-space studs screwed into the sides of the fire-box to support the ends of the deflector.

Referring to Figs. 8, 9, and 10, which illustrate my improved double clack, (marked 15 in Fig. 1,) 36 is the clack-valve; 37, the entrance of feed-pipe from pump or injector; 38, the outlet of circulation-pipe, (marked 18 in Fig. 1;) 39, Fig. 10, the outlet from the boiler through valve 17. (See Figs. 1 and 3.) 41 is a continuation of 39. 42 is the outside shell of the clack-box, into which is screwed a hollow tube 43, having slots 44 in it to allow the water to enter 41 from 39. 45 is a hollow space surrounding tube 43, and 46 is a hollow space surrounding valve 36. 47 is a flange for bolting the clack-box to the boiler. Valve 17 may, if desired, be omitted.

The working of my invention is as follows: When pump 14 is supplying water to the boiler, the water enters from the tender by pipe 8, passing through two-way cock 10 and pipe 13 to the pump 14, whence it passes through pipe 18 to clack 15, thence through pipe 19 into the bottom of the hollow fire-bar carrier 3 at 21, passing up through web or partition 4 to the deflector 5, leaving the top of the deflector by pipes 22 and 23, connecting it with the boiler. If the injector 16 is connected to clack 15 in place of pump 14, the water from the tender passes through pipe 9 to said injector and from thence to clack 15 by pipe 20, and it then follows the same course as above described when the pump was connected.

When my improved hollow carrier and deflector is acting as a steam-generator, no feed-water being passed into the boiler, the water in the boiler is drawn through valve 17, Figs. 1 and 2, which opens automatically for that purpose, and passes by pipe 19 into the bottom of the carrier at 21, as before, and also through pipes 24 and 25 into deflector 5, reëntering the boiler by pipes 22 and 23, thus giving a free circulation. Pipes 22 and 23 act as steam-outlets, being placed at the highest part of the deflector 5.

Referring to Figs. 8, 9, and 10, the action of my improved clack (marked 15 in Figs. 1, 2, and 3) is as follows: The feed-water entering at 37 (see also Figs. 1 and 2) lifts valve 36 and closes pipe or chamber 41, formed by tube 43. It is then forced through outlet 38 and pipe 18, Fig. 1, to the carrier and deflector. Should pump 14 or injector 16 not be working, the boiler-pressure closes valve 36 down on pipe 37 and allows the water from the boiler to pass through 39 to 41, (entering 41 through slots 44,) out at 38, and into circulation-pipe 19, Fig. 1, to the carrier and deflector, as shown by arrow-heads.

In some cases one large pipe would be preferable to the two pipes 24 and 25, and also in the case of the deflector being made slightly arched one of the pipes 22 23 would be done away with, the remaining one being placed in the center of the deflector.

If clack 15 is made with valve 17, the valve must always remain open.

My improved combined carrier and deflector may be made of steel, copper, brass, or other suitable metal, and it can either be cast all in one piece or made in sections and riveted or otherwise fitted together. The shape may also be altered more or less to suit different classes of fire-boxes.

Having fully described my invention, what I claim, and desire to secure by Letters Patent, is—

1. The combination, with a boiler provided with an internal fire-box; of hollow bars at the back and front of the lower part of the fire-box, a hollow inclined deflector in the upper part of the fire-box, a hollow partition connecting the said hollow bars and deflector, a water-pipe connection between the upper part of the deflector and the interior of the boiler, and a water-inlet pipe connected to one of the said hollow bars, substantially as set forth.

2. The combination, with a boiler provided with an internal fire-box; of hollow bars at the back and front of the lower part of the fire-box, an inclined hollow deflector in the upper part of the fire-box, a hollow partition connecting the said hollow bars and deflector, and separate water-pipe connections between the upper and lower parts of the said deflector and the interior of the boiler, substantially as set forth.

JOHN KING.

Witnesses:
WILLIAM J. THORN,
CHAS. ROCHE.